INVENTOR.
Juan L. Rayces

INVENTOR.
Juan L. Rayces

April 19, 1966 J. L. RAYCES 3,247,367

SOLAR SIMULATOR

Filed Oct. 31, 1960 3 Sheets-Sheet 3

INVENTOR.
Juan L. Rayces

United States Patent Office 3,247,367

Patented Apr. 19, 1966

3,247,367

SOLAR SIMULATOR

Juan Luis Rayces, Westport, Conn., assignor to The Perkin-Elmer Corporation, Norwalk, Conn., a corporation of New York Filed Oct. 31, 1960, Ser. No. 66,102
9 Claims. (Cl. 240—41.3)

This invention relates to a large artificial illumination system intended to be used as an artificial sun in the testing of space vehicles and similar equipment. More specifically, the invention comprises a more or less planar array of a large number of modular units, each unit having a light source and a collimating system and being of such luminous power and quantity that the total array of these modular units has the approximate intensity of the sun.

Ever since man has first attempted to penetrate outer space, a device has been needed for testing space vehicles as to solar radiation effects without subjecting them to the risk of loss normally attendant upon their being fired into and through the upper regions of the atmosphere. The technological problem of constructing a solar simulator, able to approximate the great intensity of sun radiation that a space vehicle would actually encounter on such a flight, particularly at the higher altitudes of the atmosphere and beyond, is extremely difficult. Nevertheless, as space technology has developed, the need for such a solar simulator has become so great that such an instrument must be considered practical even though its cost should be quite high.

In order to approximate the actual effect of the sun upon a space vehicle, a solar simulator must conform to the specifications of sunlight reaching such a vehicle in outer space in a number of ways. Thus, the spectral make-up of the radiation emanating from the solar simulator must be substantially the same as that of sunlight before it has been filtered through any appreciable amount of atmospheric air. Further, since the sun's rays reaching the vicinity of the earth are substantially parallel, the solar simulator must also emit almost parallel rays. The intensity of the emitted radiation must also be substantially the same as that of sunlight over a large cross-sectional area and over a range of distances from the solar simulator in order to be capable of evenly illuminating a space vehicle of reasonably large size over its entire exposed surface both in frontal plane and in depth.

Therefore, the solar simulator must approximate the sunlight reaching the area adjacent the outer reaches of the earth's atmospheric air envelope in all of the following ways: (1) spectral make-up; (2) substantial parallelism of the light rays; (3) intensity of radiant energy content; and (4) uniformity of intensity over a volume sufficiently large to include the entire space vehicle. Meeting all of these specifications at the same time is extremely difficult. For example, in order to approximate the spectrum of the sun over the more important parts thereof, the solar simulator of the present invention has been so constructed as to require little filtering to attain the same spectral curve as the sun from 0.2 to 10 microns in wavelength. Further, since the sun is an extremely brilliant body (the brightness being about $1.65\times10^5$ candlepower per square centimeter), the solar simulator must necessarily have an extremely powerful light source or sources in order to be able to illuminate a reasonably large area (approximately 20 by 20 feet) with substantially the same illumination as that produced by the sun in outer space.

It can be shown that in order for the illumination emanating from the solar simulator to be uniform over such a large area and for an axial depth of, say, 20 feet, the optical system used for projecting the rays from the light source itself onto this area must not only collimate the light (i.e., make the light rays parallel) but must also satisfy what is known as the sine condition. Further, in order to approximate the illumination intensity of the sun over such a large volume, not only must the light source be extremely bright itself, but the optical system used therewith must be quite "fast." Since the relative "speed" of an optical system depends upon both the focal length and the aperture of the system, both these quantities must be considered when determining the parameters of the optical system; and the choice thereof will in part determine the nature of the lamp source strength required. On the other hand, since there are commercially available only a limited number of powerful light sources providing the type of spectral distribution and intensity desired, the entire system must be designed with the goal of adapting the optical system to the lamp, as well as vice versa. Thus, since the aperture ratio (the ratio of focal length to clear aperture) of the optical system determines the relative speed of the optical system and since the intensity required is extremely large, all practical means for making the optical system aperture ratio quite small (so that the optical system is "fast") must be utilized. Similarly, a light source of great brilliance must be utilized so that the required optical system aperture ratio (F-number) remains obtainable.

Since no commercially available single light source can approximate the brightness of the sun over a sufficiently large area to illuminate a 20 by 20 by 20 foot cube as required, the invention uses plural light sources and a composite or modular optical system; that is, an array of light sources each having its own optical system. Therefore, the present invention utilizes a large number (say 200 or so) of comparatively small, powerful gaseous or carbon arc lamps, each having a complete optical system associated therewith.

An object of the invention is, therefore, the provision of an artificial light projector for producing substantially the same spectral make-up, parallelism of light rays, and intensity and uniformity of illumination as that of solar radiation in the vicinity of the earth, which projector is capable of evenly illuminating a 20 by 20 by 20 foot cube.

A further object of the invention is the provision of such an artificial sun as above described which is practical to manufacture.

Another object is the provision of such a solar simulator composed of modular units, thereby reducing the weight of the entire system and also allowing repetitive manufacturing techniques to be applied thereto.

Another object of the invention is the provision of such a solar simulator which is corrected for the secondary, but, nevertheless, substantial errors in uniformity of illumination which would be caused by chromatic and spherical aberrations and nonconformity to the sine condition.

Further objects and features of the invention will be obvious to one skilled in the art upon perusing the following specification and upon studying the accompanying drawings forming a part thereof, in which.

Figures 1, 3:
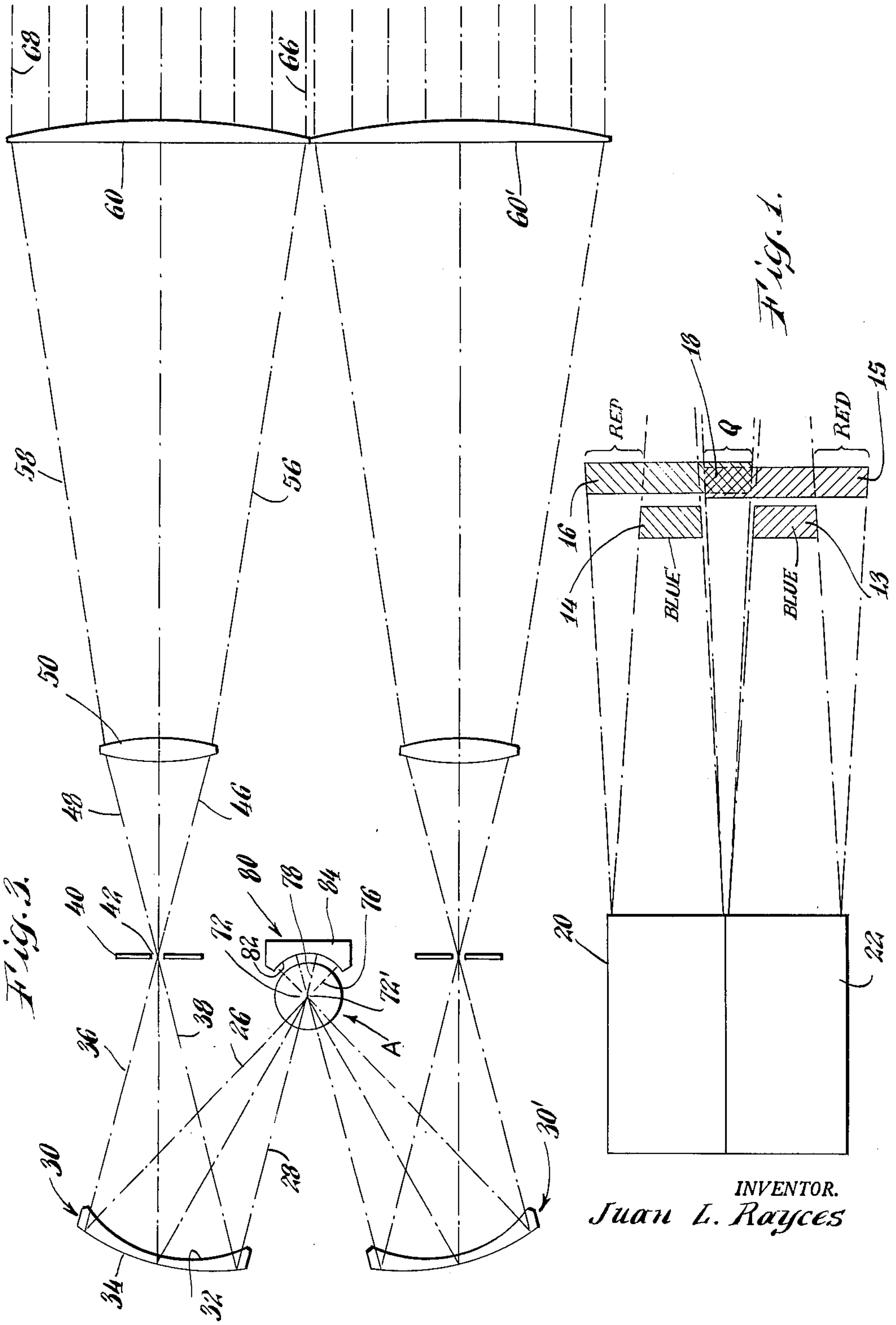
FIG. 1 shows the effect of chromatic aberration on the evenness of spectral composition of the area illuminated.
FIG. 3 is a schematic plan view of the single light source and multiple optical system shown in FIG. 2.

Before describing the structure of a preferred embodiment of the inventive solar simulator, certain advantageous characteristics of the invention will be explained by reference to the various figures in the drawing.

Figure 2:
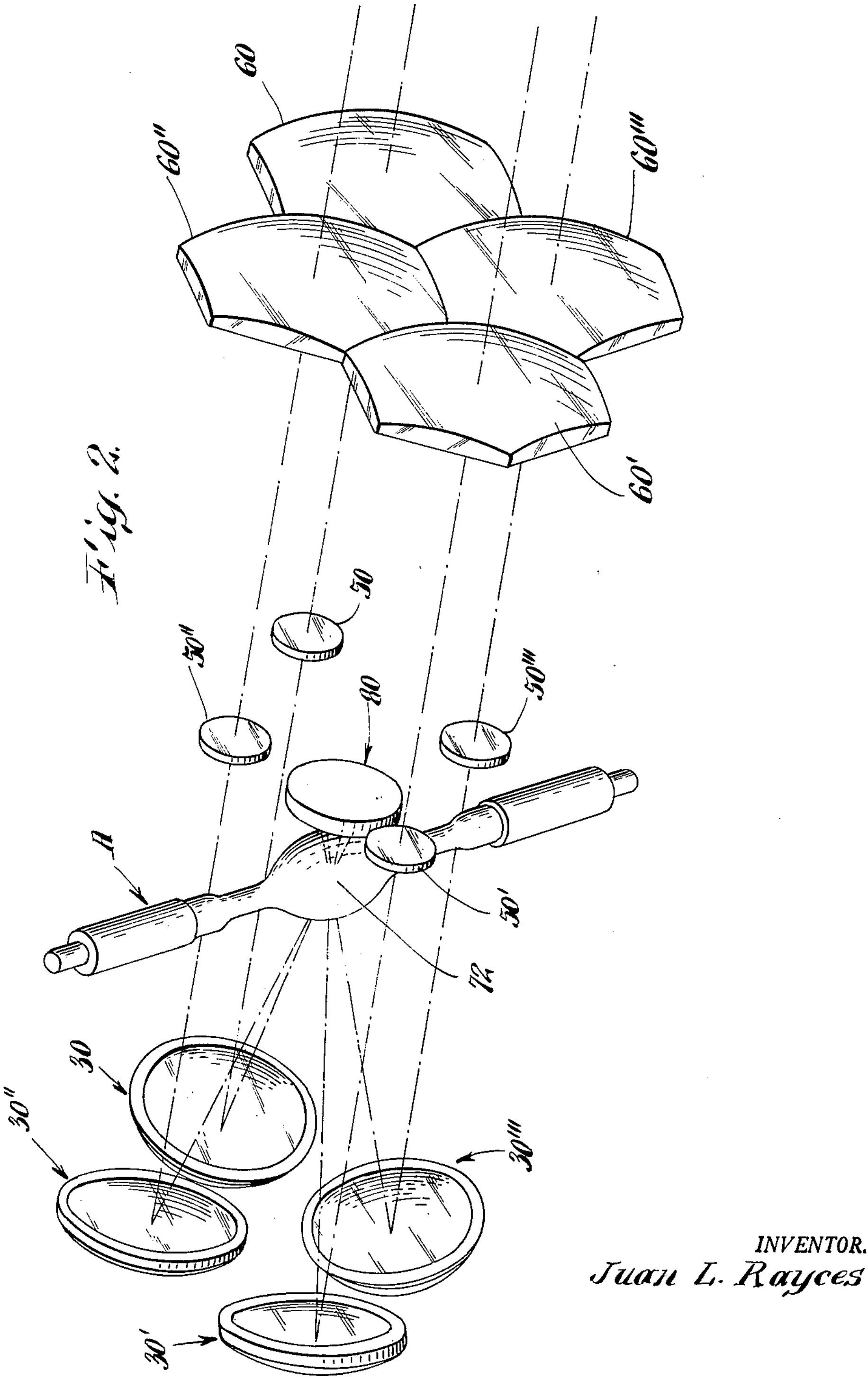
FIG. 2 is a perspective view of the optical system used with each light source module, showing the relationship of the four optical subassemblies of which it is composed.
Figure 4:
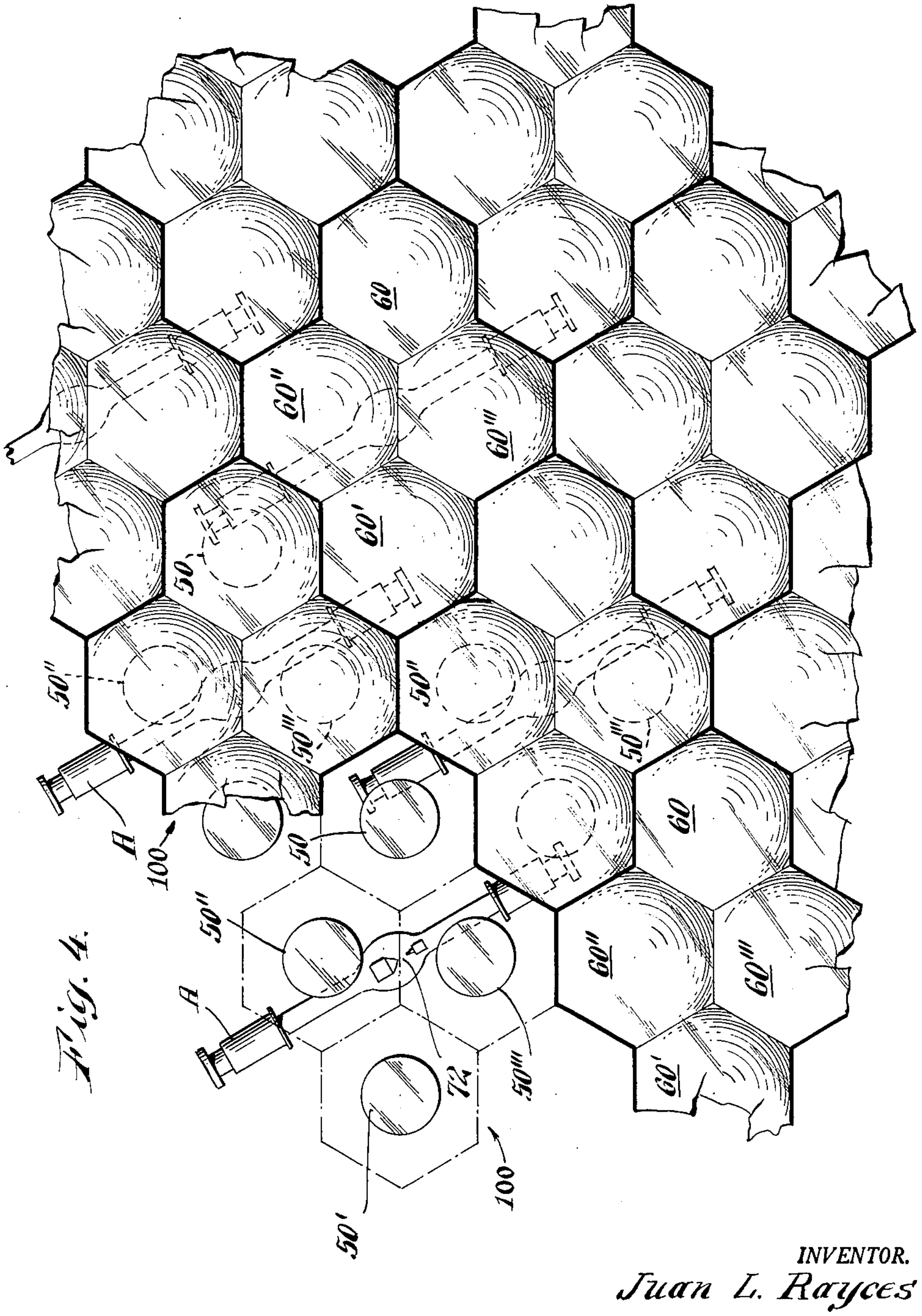
FIG. 4 is an elevational schematic view of part of the entire solar simulator, showing the arrangement of the various light sources and the final optical elements of the system associated therewith.

In understanding why a large array of modular units is employed in the invention, it should be borne in mind that the area of a collimated light beam emanating from an optical system can be no larger than the clear aperture of the last element thereof. Since enlarging the clear aperture of the lens without changing its focal length increases the thickness along the optical axis in direct proportion to the diameter thereof, it can be seen that the increase of optical material needed for a lens of a diameter twice that of another lens is actually eight times. That is, if the clear aperture of a small lens is equal to C and the thickness of the lens is T, then a large lens, having a clear aperture of 2C would have a thickness of 2T. The beam of collimated light which could emanate from this larger lens would be equal in area to 4 (the square of 2), but the amount of material necessary to form the lens would be equal to the cube of 2 or 8. On the other hand, four lenses of the same diameter (C) as the smaller lens could be utilized in the manner shown at the extreme right in FIGURE 2 to yield substantially the same combined clear aperture as the aforementioned larger lens without increasing the thickness of any one of the individual lenses. The optical material utilized in an array of four lenses such as shown at the right in FIGURE 2 is therefore one-half of that required for a single lens having the same focal length and having a diameter equal to the diameter of the four lenses combined. In an optical system having an exit clear aperture of approximately 20 feet square, this saving in material is obviously of no small consequence. Further, FIGURE 4 shows how this principle of departmentalizing the last optical element of the system can be carried forward to make a large optical surface from groups of four of single lenses. In fact although FIGURE 4 only shows a portion of the lens groups utilized, when it is remembered that approximately 200 such quadrauple lens groups are actually employed, it is quite apparent that a single lens of 20 foot diameter would necessarily require an immense amount of optical material compared to that actually utilized in the invention.

The fact that the collimated rays emanating from the last elements of the optical system must also evenly illuminate the entire area to the right of these elements is diagrammatically illustrated by the fact that the rays emanating from the last lenses (60 and 60′) in FIGURE 3 are all evenly spaced from each other. It can be shown that the necessary and sufficient condition for an optical system to collimate evenly a beam of light (i.e. illuminate with equal intensity over an area) is that the optical system itself conforms to the sine condition. Expressed algebraically, the sine condition states that if the equal distances between each of the parallel emergent rays shown in FIGURE 3 is $h$, then:

$$\frac{h}{\sin a}=\frac{2h}{\sin b}=\frac{3h}{\sin c}=\frac{4h}{\sin d}$$

where $a$, $b$, $c$ and $d$ are the angles (as measured from the optical axis) of the rays as they leave the light source.

FIG. 1 schematically shows the effect of chromatic aberration on the uniformity of illumination of a volume lit by a modular collimating system. Thus, optical systems 20 and 22, uncorrected for chromatic aberration will have the tendency of focusing blue light in a narrower beam than red light if the average wavelength of light (i.e. yellow-green) is exactly collimated. Therefore, areas such as 13 and 14 will tend to be much more rich in blue than in red light; areas 15 and 16 would be richer in red, and area 18 would be doubly rich in red because of the contribution of both optical systems 20 and 22. Therefore, in order for a composite system to illuminate a volume with substantially uniform spectral content light, the optical sub-assemblies making up the composite must be corrected for chromatic aberration. Since in the present application the volume illuminated by the solar simulator as a whole must have substantially uniform radiation over a large volume as to both intensity and spectral composition, the optical system is chromatically corrected.

The preferred system utilized in the module for each arc lamp is best seen in FIGURE 2, wherein four optical sub-assemblies are shown grouped about each such light source. Thus mirror 30 relay lens 50, and final lens 60 form only one of four similarly numbered (except for primes) optical sub-assemblies utilized with each arc lamp A.

As is best seen in FIG. 3, in order to accomplish the desirable, in fact essential, uniformity and achromatism of the individual sub-assemblies and therefore of the module composed thereof, a few optical niceties have been incoporated into the system. Thus, mirror 30 is a Mangin mirror. In other words, mirror 30 is made up of mirror surface 34 coated on the back of negative lens 32 so that this mirror 30 has both reflecting and refracting properties. As can be seen in FIGURE 3, the converging power of mirror 30 is more than sufficient to collimate the light rays 26, 28 from arc lamp A, so that the light rays 36, 38 actually converge to a theoretical point 42 adjacent field stop 40, cross, reach lens 50 as rays 46, 48, and then emerge therefrom as 56, 58 before reaching last lens element 60. Although the positioning and relative strength of lenses 50 and 60 must necessarily be such as to collimate the emerging light rays 66, 68, the relative position and positive dioptric power of lenses 50 and 60 are also so chosen that the concave lens 32 (having negative dioptric power) of the Mangin mirror conteracts their spectrum-dispersing effect. The exact curvatures of lens element 32, relay lens 50, and final lens 60 are so chosen that the Conrady condition for achromatism is met with the use of only one optical material. Therefore, the optical system is semi-apochromatic, i.e., the modular optical system is substantially corrected for chromatism over a very large spectral range.

Although the concept of using modules to form a composite whole has been carried forward so that each light source has four complete optical sub-assemblies associated therewith (see FIGURE 2), a single additional collecting mirror 80, composed of spherical blank 84 and front silvering 82, is employed for focusing the rays 76 emanating in a backward direction from the arc or spark 72 of the arc lamp A (see FIG. 3). The curvature of the backing mirror 80 and its relative position from spark 72 is so chosen that the spark is reimaged substantially upon itself as 72′. Since the actual illuminating spark is quite small, back collecting mirror 80 is preferably positioned as close as possible thereto and therefore has a very short focal length so as to gather most of the light rays which would otherwise be wasted. Since image 72′ is closely adjacent and in substantially the same plane as the original spark 72, the optical system previously described (i.e., elements 30, 40, 50, and 60) affects the image 72′ in substantially the same manner as the original spark 72. Thus, the light which would otherwise be wasted from the spark 72 is preserved and sent through the optical system in the same manner as previously described, thus making available a large fraction of the light admitted by lamp A.

The principle of departmentalizing is expanded as can be seen in FIGS. 2, 3 and especially 4, to compose a very large light projector composed of many light sources, each having a plurality of (namely four) optical sub-assemblies utilized therewith. Thus, the principle of sub-dividing in order to make feasible the creation of a large clear aperture in each one of the modules (see FIG. 2), as well as in the general array of modules (see FIG. 4) has been utilized to reduce the amount and weight of the optical material sufficiently to allow the final lens array 60 to be self-supporting.

The arrangement of the modules 100 relative to each other is best perceived by a comparison of FIGURE 4 and FIGURE 2. As can be seen in these two figures, the final lenses 60, 60', 60'', and 60''', form groups of four, interlocking with adjacent groups of four to yield finally the honeycomb-like structure shown in FIGURE 4, which is not only in one plane but also composed of closely fitting pieces of optical material. The relative positions of some of the arc lamps A and the various relay lenses, 50, 50', 50'' and 50''' are also illustrated in FIG. 4.

Therefore, the present invention provides, by utilizing a plurality of modules each of which is in turn composed of essentially four optical systems and one lamp, an artificial light projector of such great intensity and close approximation to the sun's radiation as to parallelism and spectral make-up of the radiation that the system is capable of illuminating a 20 by 20 by 20 foot cube. The apparent parallelism of the sun's rays in the vicinity of the earth is best measured by the fact that the sun subtends an angle of approximately 30 minutes from a point at the outer reaches of the earth's atmosphere; the individual light sources of the invention will subtend an angle of 53 minutes if the following specifications are followed.

The lamp source is an Osram XBO 2001 arc lamp of 1800 watt power and having a brightness of 5 times $10^4$ candle power/centimeters$^2$. The arc size of this lamp is 2.1 by 4.2 millimeters which is essentially doubled to 4.2 millimeters square by the action of the spherical mirror 80. This front-surface mirror 80 has a radius of curvature of approximately 1¼ inches and is situated this same distance behind the lamp arc or spark gap 72. The back-surface Mangin mirror 30 is situated approximately 9 inches away from the arc 72 and, having a radius of curvature of approximately this same dimension, reimages the arc at point 42 in the plane of field stop 40. Thus, image 42 is formed approximately 9 inches in front of (i.e., to the right in FIG. 3) of Mangin mirror 30 and is approximately 6 inches behind relay lens 50. This relay lens, which has a diameter of about 3 inches, is approximately 20 inches to the left of final hexagonal lens 60 which latter is capable of being circumscribed by a circle of 6 inch diameter. The effective focal length of the entire system of mirror 30 and lenses 50 and 60 is 12 inches so that the arc 72 (including its image 72') will apparently subtend approximately 53 minutes in the 20 by 20 by 20 foot cube to the right of the final hexagonal lenses 60. Since the brightness of the arc lamps is approximately ⅓ that of the sun, the apparent brightness of each arc lamp as seen in this 20 foot cube will be approximately the same as the sun also, assuming that the optical system has, as herewith disclosed, a total relative aperture speed of approximately $F/1$. Actually this optical speed of $F/1$ is the speed of the four optical sub-assemblies used with each light source combined, the relative speed of a single mirror 30, lens 50, and lens 60 being only $F/2$ (since 12'' divided by 6'' equals 2).

The optical system is corrected for chromatic aberration by means of utilizing the negative dispersive effect of the negative element 32 of Mangin mirror 30 to counteract the opposite (positive) dispersive effect of relay lens 50 and final lens 60. Since spherical aberration as well as non-conformity to the sine condition (as previously described) will cause uneven lighting of the volume illuminated by the solar simulator, aspheric (and toric) surfaces, as well as conventional "bending" of the lenses is utilized to minimize spherical aberration, as well as to satisfy the sine condition. Further, so that the right-hand surfaces of the final lenses (60) do not act as concave reflectors (and thereby focusing the reflected rays from the space vehicle surface back as "hot spots"), this surface must be convex, as shown in FIG. 3. Preferably, the left-hand surface thereof should also be either plane or else concave (as seen from the left in FIG. 3) for the same reason. Thus, the center of curvature of the right-hand surface of the final lenses is on the (left-hand) side of the lens closer to light source; and the center of curvature of the left-hand surface of these lenses is either on this same light source side or else at infinity (when this left-hand surface is plane). Since a center of curvature at infinity means there is no (real) center of curvature, both of these surfaces may be said to have their center of curvature (if any) on the side of the lens closer to the light source.

Thus, the invention provides an extremely fast optical system, requiring for each lamp a minimum of costly optical material (for example, fused silica), thereby saving great cost and weight, alleviating mounting difficulties, and making practical the manufacture of the honeycomb of hexagonal final lenses 60 of substantially one-piece construction except for mounting means between lenses and groups.

The invention therefore succeeds in overcoming an extremely difficult technological problem with only a minimum of optical material, high approximation of the radiant energy of the sun (the aforementioned Osram arc lamp, although similar in spectral make-up to that of the sun, should be further filtered), and although utilizing a large number of modular units, nevertheless, is practical even though relatively expensive to manufacture. Thus, although in order to illuminate the 20 by 20 by 20 foot cube previously mentioned, approximately 200 modules of the type shown in FIG. 2 must be arranged in a manner schematically outlined in FIG. 4, the total amount of, say, fused silica required is relatively small because of the modular nature of the solar simulator.

Although the invention has been illustrated and described with specific numerical data for effective focal length, clear apertures, and light source brightness and size, the actual dimensions of the optical system and type of light source chosen may be varied without departing from the spirit of the invention. Therefore, the invention is not limited to any of the specific sizes of optical elements disclosed. The invention may also be utilized for purposes other than solar simulation. Because of the high degree of collimation and corrections for chromatic and spherical aberration and also conformity to the sine condition, the inventive radiant energy collimating system may be used as an extremely powerful, albeit somewhat expensive, searchlight. The invention is therefore not limited to any specific numerical values or exact use; but, on the contrary is defined in the appended claims.

I claim:

1. A radiant energy projector for projecting substantially parallel light and other radiant energy comprising:
   - a plurality of radiant energy sources;
   - each of said sources having associated therewith an optical system;
   - said optical system comprising a plurality of substantially identical optical sub-assemblies, each of said sub-assemblies being composed of a plurality of optical elements;
   - the optical elements of each sub-assembly most remote from its associated radiant energy source defining the final optical axis of said sub-assembly;
   - the optical elements in each of said sub-assemblies nearest to the radiant energy source being concave mirrors positioned relative to each other and the associated radiant energy source so as to collect at least part of the radiation emitted therefrom;
   - the optical elements in each of said sub-assemblies being of such dioptric power and relative position as to collimate the radiation collected by the concave mirror of the sub-assembly;
   - said collimated radiation of each sub-assembly therefore being parallel to said final optical axis of that sub-assembly;

each said final optical axis being substantially parallel to the final optical axes of the other sub-assemblies in the same optical system and all the other optical systems;

said sub-assemblies being symmetrically arranged relative to its associated radiant energy source;

that optical element which is most remote from the associated radiant energy source being a large diameter positive refractive element having two optically active surfaces;

each of said most remote large elements having its periphery contiguous to the corresponding large refractive elements of the other optical sub-assemblies, thereby forming a large composite array of lenses, so that the continuous area beyond said lens array is evenly illuminated.

2. A radiant energy projector according to claim 1, in which each of said sub-assemblies comprises in addition to said concave mirror at least two refractive elements, at least one pair of refractive elements having dioptric power of opposite sign and of such magnitude relative to each other and any other refractive elements in said sub-assemblies that the chromatic aberration introduced by the refractive elements is mutually balanced out.

3. A radiant energy projector according to claim 2, in which at least one of said optical elements is aspheric so as to substantially eliminate spherical aberrations.

4. A radiant energy projector according to claim 1 in which the more remote refractive surface of each of said most remote elements has its center of curvature on the side of said most remote element closer to its associated energy source, so as to avoid concentration of the back reflection from the object illuminated by said projector.

5. A radiant energy projector according to claim 1 in which both refractive surfaces of each of said last elements have their real centers of curvature, if any, on the side of said most remote element closer to its associated energy source, so as to avoid concentration of the back reflection from the object illuminated by said projector.

6. A radiant energy projector according to claim 1, in which each of said sub-assemblies is substantially corrected for chromatic and spherical aberration and conforming to the sine condition.

7. A radiant energy projector according to claim 1 in which each of said optical sub-assemblies comprises, in addition to said concave, collective mirror, a relay lens and a final collimating lens, each of said relay and collimating lenses having positive dioptric power.

8. A radiant energy producer according to claim 1 in which said collecting mirror is of the Mangin type, in which the negative lens element is of such dioptric power and position as to compensate the chromatic aberration of said positive relay and final collimating lenses.

9. A radiant energy projector for projecting substantially parallel light and other radiant energy comprising:

a plurality of radiant energy sources;

each of said sources having associated therewith a modular optical system;

said optical system comprising a plurality of substantially identical optical sub-assemblies, each of said sub-assemblies being composed of a plurality of optical elements;

the optical elements of each sub-assembly most remote from its associated radiant energy source defining the final optical axis of said sub-assembly;

the optical elements in each of said sub-assemblies nearest to the radiant energy source being concave mirrors positioned relative to each other and the associated radiant energy source so as to collect at least part of the radiation emitted therefrom;

the optical elements in each of said sub-assemblies being of such dioptric power and relative position as to collimate the radiation collected by the concave mirror of the sub-assembly;

said collimated radiation of each sub-assembly therefore being parallel to said final optical axis of that sub-assembly;

each said final optical axis being substantially parallel to the final optical axes of the other sub-assemblies in the same optical system and all the other optical systems;

each of said sub-assemblies being substantially corrected for chromatic and spherical aberration and conforming to the sine condition;

said concave collecting mirrors of each sub-assembly of the modular optical systems, which are the optical elements nearest to the radiant energy source of that system and therefore receive radiation directly from said source, being symmetrically arranged about one side of said radiant source;

and a single additional backing mirror in each optical system positioned on the other side of the radiant energy source, for sending at least some of the rays from each source, which would otherwise travel to said other side of said source and therefore away from said nearest optical elements of said modular optical systems, toward said nearest optical elements, thereby conserving radiant energy which would otherwise be lost;

said sub-assemblies being symmetrically arranged relative to its associated radiant energy source;

that optical element which is most remote from the associated radiant energy source being a large diameter positive refractive element having two optically active surfaces;

each of said most remote large elments having its periphery contiguous to the corresponding large refractive elements of the other optical sub-assemblies, thereby forming a large composite array of lenses, so that the continuous area beyond said lens array is evenly illuminated.

References Cited by the Examiner

UNITED STATES PATENTS

| | | | |
|---|---|---|---|
| 820,053 | 5/1906 | Lamb | 88—24 |
| 1,402,816 | 1/1922 | Wallis | 240—41.3 |
| 1,623,699 | 4/1927 | Price | 240—3 |
| 1,740,229 | 12/1929 | Dorey. | |
| 1,784,171 | 12/1930 | Bertling | 240—1.1 |
| 1,838,173 | 12/1931 | Chretien | 88—24 |
| 1,916,320 | 7/1933 | Ives | 88—24 |
| 1,946,088 | 2/1934 | Maurer | 88—24 |
| 2,097,785 | 11/1937 | Field | 240—41.3 X |
| 2,114,232 | 4/1938 | Muller | 240—3 |
| 2,506,131 | 5/1950 | Bonnet | 88—24 |
| 2,515,862 | 7/1950 | Carlton et al. | 88—24 |
| 2,562,077 | 7/1951 | Winnek | 88—24 |
| 2,587,956 | 4/1952 | Bastien | 240—41.3 X |
| 2,689,502 | 9/1954 | Ayres | 88—24 |
| 2,873,643 | 2/1959 | St. Genier | 88—24 |
| 2,954,461 | 9/1960 | Tucker | 240—106 |

FOREIGN PATENTS

| | | |
|---|---|---|
| 101,707 | 8/1937 | Australia. |
| 275,840 | 6/1914 | Germany. |
| 707,064 | 4/1931 | France. |
| 925,505 | 4/1947 | France. |
| 385,495 | 12/1932 | Great Britain. |

OTHER REFERENCES

"Fundamentals of Optics" (Jenkins and White), published by McGraw-Hill (New York), 1950.

German application No. 698,762, November 1940, K157 *a* Gr. 504.

NORTON ANSHER, *Primary Examiner.*

GEORGE HYMAN, Jr., *Examiner.*